(12) United States Patent
Matsui et al.

(10) Patent No.: US 8,570,413 B2
(45) Date of Patent: Oct. 29, 2013

(54) IMAGE-PICKUP DEVICE AND DISPLAY APPARATUS

(75) Inventors: Masafumi Matsui, Kanagawa (JP);
Yoshiharu Nakajima, Kanagawa (JP);
Yasuyuki Teranishi, Kanagawa (JP)

(73) Assignee: Japan Display West, Inc., Chita (JP)

( * ) Notice: Subject to any disclaimer, the term of this patent is extended or adjusted under 35 U.S.C. 154(b) by 163 days.

(21) Appl. No.: 12/297,427

(22) PCT Filed: Feb. 7, 2008

(86) PCT No.: PCT/JP2008/052056
§ 371 (c)(1),
(2), (4) Date: Feb. 26, 2009

(87) PCT Pub. No.: WO2008/102649
PCT Pub. Date: Aug. 28, 2008

(65) Prior Publication Data
US 2009/0310007 A1 Dec. 17, 2009

(30) Foreign Application Priority Data
Feb. 21, 2007 (JP) ................................. 2007-040148

(51) Int. Cl.
*H04N 5/335* (2011.01)
*H04N 3/14* (2006.01)

(52) U.S. Cl.
USPC ......... 348/302; 348/294; 250/208.1; 345/104

(58) Field of Classification Search
USPC ................. 348/294, 302; 250/208.1; 345/104
See application file for complete search history.

(56) References Cited

U.S. PATENT DOCUMENTS

| | | | |
|---|---|---|---|
| 6,842,192 B1 * | 1/2005 | Suzuki et al. | 348/308 |
| 6,876,388 B1 | 4/2005 | Lee et al. | |
| 7,046,282 B1 * | 5/2006 | Zhang et al. | 348/294 |
| 7,428,010 B2 * | 9/2008 | Nakamura et al. | 348/229.1 |
| 7,483,005 B2 * | 1/2009 | Nakamura et al. | 345/87 |
| 7,612,818 B2 * | 11/2009 | Nakamura et al. | 348/308 |
| 2002/0074551 A1 | 6/2002 | Kimura | |
| 2002/0158976 A1 * | 10/2002 | Vni et al. | 348/243 |
| 2003/0205660 A1 * | 11/2003 | Takahashi et al. | 250/208.1 |
| 2004/0008172 A1 | 1/2004 | Nakamura | |
| 2004/0189567 A1 | 9/2004 | Kimura | |
| 2005/0051775 A1 | 3/2005 | Meynants | |
| 2005/0258341 A1 | 11/2005 | Nishikawa | |
| 2005/0264666 A1 | 12/2005 | Iwasawa et al. | |
| 2006/0033729 A1 | 2/2006 | Yoshida | |

FOREIGN PATENT DOCUMENTS

| | | |
|---|---|---|
| JP | 07-325319 | 12/1995 |
| JP | 10-108074 | 4/1998 |
| JP | 10-285466 | 10/1998 |
| JP | 11-308531 | 11/1999 |

(Continued)

*Primary Examiner* — Anthony J Daniels
(74) *Attorney, Agent, or Firm* — Robert J. Depke; The Chicago Technology Law Group, LLC (57) ABSTRACT

An image-pickup device includes a photoelectric conversion element 5 that converts light into electric charge, a capacitor 6 that stores electric charge which the photoelectric conversion element 5 has obtained by conversion, reset means 7 for discharging the electric charge in the capacitor 6, and an amplifying thin-film transistor 8 that receives, amplifies, and outputs the electric charge stored in the capacitor 6. In addition, the image-pickup device is configured so that the amplifying thin-film transistor 8 forms a source follower circuit.

9 Claims, 8 Drawing Sheets

(56) References Cited

FOREIGN PATENT DOCUMENTS

| | | |
|---|---|---|
| JP | 2001-251558 | 9/2001 |
| JP | 2001-292276 | 10/2001 |
| JP | 2001-339640 | 12/2001 |
| JP | 2002-268615 | 9/2002 |
| JP | 2002-314882 | 10/2002 |
| JP | 2005-160024 | 6/2004 |
| JP | 2005-347793 | 12/2005 |
| JP | 2006-013407 | 1/2006 |
| JP | 2006-148901 | 6/2006 |
| JP | 2006-186032 | 7/2006 |
| JP | 2007-018458 | 1/2007 |

* cited by examiner

IMAGE-PICKUP DEVICE AND DISPLAY APPARATUS

This application is a 371 U.S. National Stage filing of PCT/JP2008/052056, filed Feb. 7, 2008, which claims priority to Japanese Patent Application Number JP 2007-040148 filed Feb. 21, 2007, all of which are incorporated herein by reference.

TECHNICAL FIELD

The present invention relates to an image-pickup device including photoelectric conversion elements, and a display apparatus.

BACKGROUND ART

While, in general, photoelectric conversion elements, such as CCD (Charge Coupled Devices) sensors and CMOS (Complementary Metal Oxide Semiconductor) sensors, have been known as image-pickup devices that pick up images, recently, it has been proposed that thin-film transistors (hereinafter, "Thin Film Transistor" is abbreviated as "TFT") are caused to function as photoelectric conversion elements in combination with capacitors or the like. As one example of such image-pickup devices, for example, there are image-pickup devices that include liquid-crystal display elements, TFTs that function as photoelectric conversion elements, and so forth for respective pixels disposed in a matrix, and that also include a backlight or frontlight which serves as a light source. The image-pickup devices are configured so as to be capable of performing information input by utilizing light incident onto the TFTs while the image-pickup devices perform image display by utilizing transmission of light from the light source through the liquid-crystal display elements (for example, see Patent Document 1). Because the image display and the information input can be performed in the same display region in the above-mentioned configuration, it is expected that the image-pickup devices are used as information input/output devices as replacements for touch panels.

When the above-described image-pickup devices of a display-function-integrated type are realized using a commonly known low-temperature polysilicon technique, it is considered that it is difficult to obtain accurate output values because it is impossible to disregard attenuation of signals that is caused by parasitic capacitances in panels. The reason is that a photocurrent, which occurs due to light irradiation, in the case of a low-temperature polysilicon (hereinafter, abbreviated as "p-Si") is smaller than that in the case of an amorphous silicon (hereinafter, abbreviated as "a-Si"). Thus, in order to realize the image-pickup devices of a display-function-integrated type using the p-Si, a certain amplification function is necessary. As a specific example of such an amplification function, there is an amplification function of storing electric charge in capacitances, such as capacitors, in accordance with electric signals that are generated in the photoelectric conversion elements, converting the electric charge into voltages, storing the converted voltages in SRAMs (Static Random Access Memory), and outputting the voltages as digital values "1" or "0" (for example, see Patent Documents 2 and 3). According to the amplification function, because the SRAMs have also the amplification function, no attenuation of signals that is caused by parasitic capacitances in panels occurs. Furthermore, because the voltages are output as the digital values, output results of the voltages have an excellent noise tolerance.

Patent Document 1: Japanese Unexamined Patent Application Publication No. 2002-268615
Patent Document 2: Japanese Unexamined Patent Application Publication No. 2001-292276
Patent Document 3: Japanese Unexamined Patent Application Publication No. 2001-339640

DISCLOSURE OF INVENTION

Technical Problem

However, in the above-described prior art, the outputs after the amplification function is performed are the digital values of "1" or "0", i.e., binary values. Thus, it is very difficult to excellently represent half tones for image-pickup results, and a complicated process or operation, such as setting of a plurality of image-pickup conditions, is necessary in order to represent the half tones.

Therefore, it is an object of the present invention to provide an image-pickup device and a display apparatus that can perform analog output which allows half tones to be excellently represented, for example, even when the image-pickup device of a display-function-integrated type is configured using a p-Si.

Technical Solution

The present invention provides an image-pickup device that has been invented in order to achieve the above-described object. The image-pickup device is characterized by comprising a photoelectric conversion element that converts light into electric charge, a storage capacitor that stores the electric charge which the photoelectric conversion element has obtained by conversion, reset means for discharging the electric charge in the storage capacitor, and an amplifying thin-film transistor that receives, amplifies, and outputs the electric charge stored in the storage capacitor. A source electrode of the amplifying thin-film transistor is connected to a power-source supplying line, a gate electrode of the amplifying thin-film transistor is connected to the storage capacitor, and the amplifying thin-film transistor forms a source follower circuit.

In the image-pickup device configured as described above, since the amplifying thin-film transistor forms the source follower circuit, when the amplifying thin-film transistor amplifies and outputs the electric charge stored in the storage capacitor, analog output can be performed by utilizing the source follower circuit. Thus, for example, even when the photoelectric conversion element is a sensor thin-film transistor in order to be easily integrated with a display function, analog output can be performed as in the case of a CCD (Charge Coupled Devices), a CMO (Complementary Metal Oxide Semiconductor) image sensor, or the like, which is a general image-pickup element. An image-pickup result can be read at a high speed, and provision for increasing the number of gradations of the image-pickup result can be realized.

Advantageous Effects

According to the present invention, because an amplification function depends on the source follower circuit, the analog output can be realized as in the case of a CCD or a CMOS image sensor, which is a general image-pickup device. The speed of image-pickup processing can be increased, and the number of gradations of the image-pickup result can be increased. Thus, by using the characteristics of the analog output that allows half tones to be excellently represented, a touch panel function, a scanner function, or the like can be realized. Furthermore, it can be considered that the image-pickup devices are applied as dimmer sensors for a backlight in a liquid-crystal display apparatus. Moreover, the amplifying thin-film transistor performs the analog output, thereby realizing the amplification function. Thus, for example, when TFT-type photosensors are used as the photoelectric conversion elements, respective constituent elements of the image-pickup devices can be manufactured using a process the same as that of typical TFTs. For example, the respective constituent elements can be disposed in display pixels of a liquid-crystal display apparatus. In other words, the image-pickup devices are very suitable for realization of integration with a display function. In addition, for example, when the image-pickup devices are embedded in the display pixels of the liquid-crystal apparatus, the image-pickup devices can be disposed so that a great decrease in aperture ratio is reduced, and can be easily disposed in a matrix for the respective display pixels. Thus, for example, multipoint recognition that was difficult to be realized in touch panels in the prior art can be realized, and a probability that the image-pickup devices will serve as key devices of a new user interface that does not exist in the prior art can be expected.

BEST MODES FOR CARRYING OUT THE INVENTION

An image-pickup device and a display apparatus according to the present invention will be described below with reference to the drawings.

First Embodiment

Figure 1:
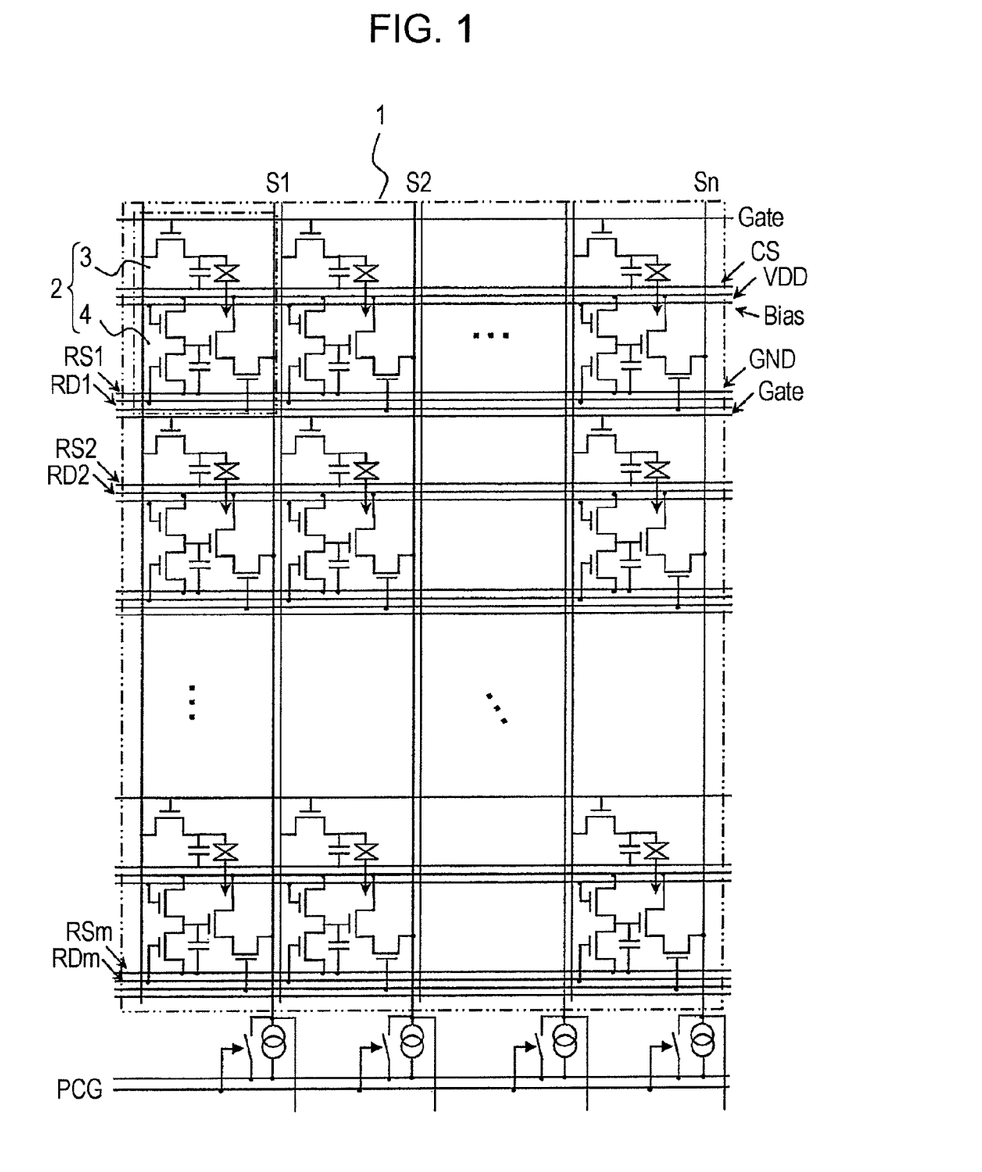
FIG. 1 is a circuit diagram showing an example of a schematic configuration of a display apparatus according to the present invention.
Figure 2:
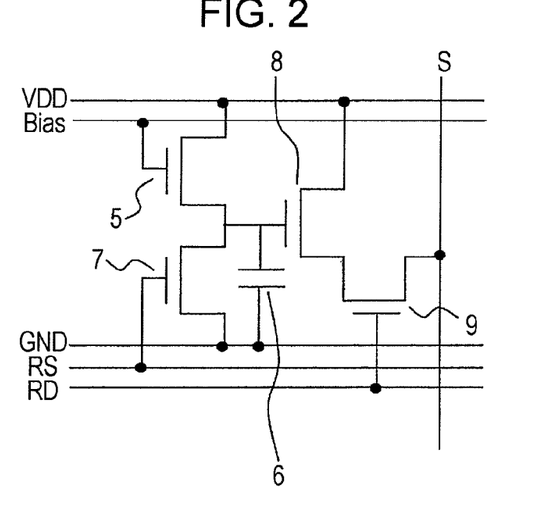
FIG. 2 is a circuit diagram showing an example of a configuration of the main portion in a first embodiment of an image-pickup device according to the present invention.

First, a first embodiment of the present invention is described. FIG. 1 is a circuit diagram showing an example of a schematic configuration of the display apparatus according to the present invention. FIG. 2 is a circuit diagram showing the first embodiment of the image-pickup device that is the main portion of the display apparatus.

First, the entire display apparatus is described. The display apparatus that is described in the embodiment is a display apparatus in which a display function and an image-pickup function are integrated. In a broad classification, as shown in FIG. 1, the display apparatus is configured by including an image-display-region section 1, a backlight or a frontlight (however, not illustrated) that serves as a light source, and a driver circuit section (however, not illustrated) for performing drive control for the image-display-region section 1.

The image-display-region section 1 is configured of a plurality of pixel units 2 that are disposed in a matrix. Additionally, each of the pixel units 2 is configured of a display element portion 3 and an image-pickup element portion 4. In addition, various types of signal lines are provided for each row and each column of the respective pixel units 2, which are disposed in a matrix. Furthermore, current sources are provided at ends of the various types of signal lines.

The display element portion 3 is a display element portion for providing a function of a so-called p-Si liquid crystal. Specifically, the display element portion 3 includes a liquid-crystal display element that is formed on a polycrystalline silicon (p-Si) substrate. The liquid-crystal display element selectively transmits light from the backlight or the frontlight, thereby performing image display. In other words, the display element portion 3 functions as an image display element in the present invention in combination with the light source (the backlight or the frontlight). In addition, although the description of the details of the p-Si liquid crystal is omitted herein because the details thereof are commonly known, characteristics can be obtained, in which the reaction velocity of the liquid crystal is increased because the p-Si easily conducts electricity compared with a non-crystalline silicon (a-Si), and also in which brightness can be increased by increasing an aperture area because the size of transistors for controlling the liquid crystal can be reduced.

The image-pickup element portion 4 functions as the image-pickup device according to the present invention. As shown in FIG. 2, the image-pickup element portion 4 includes a sensor TFT 5, a capacitor 6, a reset TFT 7, an amplifying TFT 8, and a reading TFT 9, which are formed on the p-Si substrate.

The sensor TFT 5 functions as a photoelectric conversion element that converts light into electric charge, in which a leakage current changes in accordance with the amount of received light. Thus, the source electrode of the sensor TFT 5 is connected to a power-source line VDD, and the gate electrode thereof is connected to a bias wire Bias. An applied voltage that causes the sensitivity and S/N of the sensor to be optimized is applied from the bias wire Bias to the gate electrode. In addition, the sensor TFT 5 may be configured using any other element (other than the TFT) that functions as a photoelectric conversion element, such as a PN-type diode or a PIN-type diode.

The capacitor 6 is a passive element that stores and releases electric charge (electric energy) using a capacitance, and functions as a storage capacitor that stores electric charge which the sensor TFT 5 has obtained by conversion. Thus, one end of the capacitor 6 is connected to a ground wire GND, and the other end thereof is connected to the sensor TFT 5 and the reset TFT 7. The capacitor 6 is charged by a photocurrent (electric charge) that is generated in the sensor TFT 5, whereby a voltage is generated in accordance with the charge amount. A voltage $\Delta V$ that is converted from a photocurrent $\Delta I$ depends on a capacitance $C_p$ of the capacitor 6 and a light storage time $\Delta T$, and can be represented by the equation $\Delta V = I/C_p \times \Delta T$. Thus, the longer the light storage time $\Delta T$ and the lower the capacitance $C_p$ of the capacitor 6, the higher efficiency of conversion from the photocurrent to the voltage. However, when the capacitance $C_p$ of the capacitor 6 is markedly low, it should be noted that it is impossible to disregard an influence of a parasitic capacitance of the sensor TFT 5 or a parasitic capacitance between wires.

The reset TFT 7 is disposed between the capacitor 6 and the ground wire GND in order to discharge the stored electric charge in the capacitor 6. More specifically, the reset TFT 7 is disposed in such a manner that the source electrode of the reset TFT 7 is connected to the ground wire GND, the drain electrode thereof is connected to the sensor TFT 5 and the capacitor 6, and the gate electrode thereof is connected to a reset signal line RS. Accordingly, the reset TFT 7 functions as reset means for discharging the stored electric charge in the capacitor 6 in accordance with a reset signal of the reset signal line RS.

The amplifying TFT 8 receives, amplifies, and outputs the electric charge stored in the capacitor 6. In other words, the amplifying TFT 8 has a function of amplifying a voltage corresponding to the charge amount of the capacitor 6. In addition, the source electrode of the amplifying TFT 8 is connected to the power-source line VDD, and the gate electrode thereof is connected to the sensor TFT 5, the capacitor 6, and the reset TFT 7. The amplifying TFT 8 forms a source follower circuit together with a current source that is placed at an end of a sensor signal line S.

The reading TFT 9 performs selection of the image-pickup element portion 4 and reading of an image-pickup result of the image-pickup element portion 4. The reading TFT 9 is connected to the amplifying TFT 8 in series, and the gate terminal of the reading TFT 9 is connected to a reading wire RD. Thus, the reading TFT 9 is configured so as to be able to perform line-sequentially reading for the image-pickup result that has been amplified by the amplifying TFT 8.

The image-pickup element portions 4 having the above-described configuration using the combination of the sensor TFTs 5, the capacitors 6, the reset TFTs 7, the amplifying TFTs 8, and the reading TFTs 9 are formed on the p-Si substrate. Thus, the image-display-region section 1 is built as an integrated-type active-pixel sensor array in which the display element portions 3 and the image-pickup element portions 4 are provided for the respective pixel units 2 on the same substrate. In other words, the respective constituent elements of the image-pickup element portions 4 are integrated, and are individually disposed in correspondence with the display element portions 3 for the respective pixel units 2. Thus, the resolution of the image-pickup results can be made equal to that of displayed image items. However, the image-pickup element portions 4 are not necessarily individually disposed for the respective pixel units 2. In other words, it is only necessary that the image-pickup element portions 4 be disposed in correspondence with the display element portions 3. Disposing of the image-pickup element portions 4 at a predetermined arrangement density in the image-display-region section 1, and also disposing of a predetermined number of image-pickup element portions 4 in the vicinity of the image-display-region section 1 can be realized.

In each of the image-pickup element portions 4, which are configured as described above, electric charge in the capacitor 6 is discharged by a reset process of the reset TFT 7 so that the capacitor 6 is set to be in an initialization state. After that, the capacitor 6 is charged by a leakage current of the sensor TFT 5, which changes in accordance with the amount of received light. Impedance conversion is performed by the amplifying TFT 8, which forms the source follower circuit, for a voltage across the capacitor 6 corresponding to the amount of electric charge with which the capacitor 6 has been charged. After a certain period of time, the reading TFT 9 is turned on, and a sensor output is read to the reading wire RD. Accordingly, the image-pickup element portion 4 functions as the image-pickup device according to the present invention.

In this case, in the image-pickup element portion 4, the amplifying TFT 8 forms the source follower circuit. In other words, the voltage generated across the capacitor 6 is amplified by the amplifying TFT 8, and an analog voltage is read to the reading wire RD. Thus, without setting a complicated image-pickup condition, an increase in the number of gradations of the image-pickup result can be realized. In addition, when the source follower circuit is used, an offset error caused mainly by a variation in Vth among transistors, a variation in current of the current source circuit, or the like occurs in an output value. However, for example, differential processing is performed between the output value and an output value in a case of no irradiation of light at all, an output value in a case of reset, or the like, whereby the error can be removed.

Next, processing operations in a case in which the image-pickup element portions 4 configured as described above are driven are described. FIGS. 3 to 6 are timing charts showing examples of drive control performed for the image-pickup element portions 4.

Regarding the image-display-region section 1 including the image-pickup element portions 4, which are configured as described above, the driver circuit section, which performs drive control for the image-display-region section 1, performs drive control for the image-display-region section 1 and the light source of the image-display-region section 1 in units of one-field (hereinafter, "field" is abbreviated as "F") periods as in the case of a general liquid-crystal driving method. The above-mentioned 1 F period, which is a processing unit for drive control, is defined to be, for example, 16.6 ms.

Figure 3:
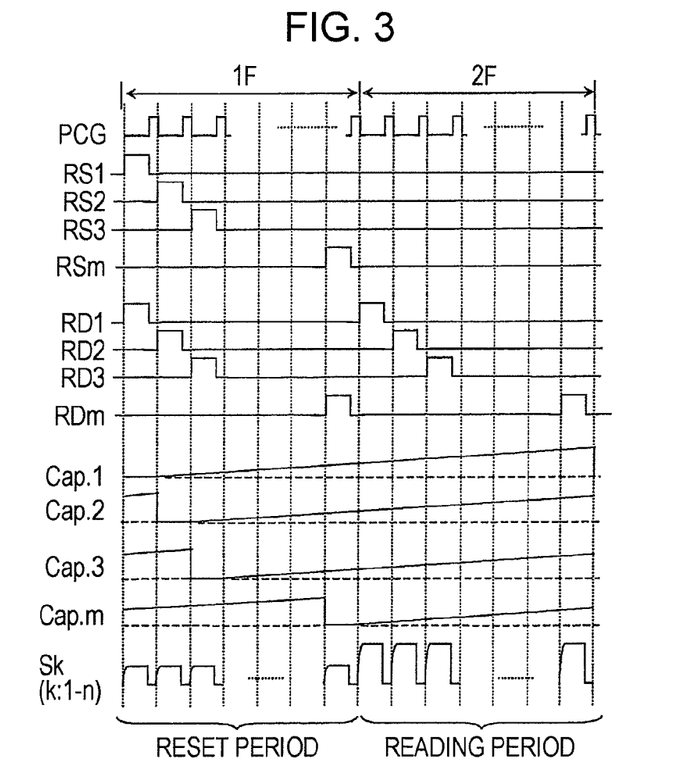
FIG. 3 is a timing chart (part 1) showing an example of drive control in the first embodiment of the present invention.

For example, in the example of drive control shown in FIG. 3, an F period is defined as a reset period, and the next F period is defined as a reading period. These periods are repeated. In addition, in the reset period, discharging of electric charge in the capacitors 6 is performed by the reset TFTs 7, and reading of stored electric charge in (voltages across) the capacitors 6 immediately after the discharging of electric charge has been performed is performed. Additionally, in the reading period, reading of stored electric charge in the capacitors 6 in a state in which discharging of electric charge is not performed by the reset TFTs 7 is performed. In this manner, the amounts of electric charge that have been converted by the sensor TFTs 5 can be determined from the differences between respective read results.

More specifically, as shown in FIG. 3, in a 1 F period that is a reset period, the driver circuit section applies driving signals RS1 and RD1 to a reset signal line (hereinafter, simply referred to as a "row reset line") RS1 and a reading wire (hereinafter, simply referred to as a "row selection line") RD1 of a first row disposed in the matrix, thereby selecting the row reset line RS1 and the row selection line RD1 and setting the reset TFTs 7 and the reading TFTs 9 that are connected to the row reset line RS1 and the row selection line RD1 to be in on-states. When the reset TFTs 7 are in the on-state, in the capacitors 6, stored electric charge is discharged, and the potentials between both electrodes are commonly set to GND. In addition, when the reading TFTs 9 are in the on-state, outputs (stored electric charge) at a point in time at which the capacitors 6 are reset are line-sequentially read to a sensor signal line S1. An object of reading of the outputs at the point in time at which the capacitors 6 are reset is to cancel offsets of the amplifying TFTs 8, which form the source follower circuits, and to greatly reduce output errors caused by variations in characteristics of the TFTs, by performing the differential processing between the outputs and outputs obtained after the following image pickup is performed. After that, the driving circuit section applies a driving signal PCG to a pre-charge line PCG, thereby setting TFTs connected to the pre-charge line PCG to be in an on-state and pre-charging the sensor signal line S1 at a reference potential. After the above-described processing operation, the driver circuit section applies driving signals RS2 and RD2 to a row reset line RS2 and a row selection line RD2 of a second row disposed in the matrix, thereby selecting the row reset line RS2 and the row selection line RD2. The driver circuit section further performs a control process that is similar to that performed for the first row. Then, the driver circuit section repeats the above-described series of processes until it selects a row reset line RSm and a row selection line RDm of an m-th row, which is the last row disposed in the matrix, and terminates the 1 F period after performance of the series of processes is finished for the m-th row.

In contrast, in a 2 F period that is a reading period, first, the driver circuit section applies the driving signal RD1 to the row selection line RD1, thereby selecting the row selection line RD1 and setting the reading TFTs 9 connected to the row selection line RD1 to be in an on-state. In this case, image-pickup results obtained in the 1 F period are maintained as voltages in the capacitors 6. Thus, when the reading TFTs 9 are in the on-state, the reading TFTs 9 read the voltages that are maintained in the capacitors 6 to the sensor signal line S1 via the amplifying TFTs 8, which form the source follower circuits. After the row selection line RD1 is selected, the TFTs connected to the pre-charge line PCG are set to be in an on-state, whereby the sensor signal line S1 is pre-charged at the reference potential. After the above-described processing operation, the driver circuit section applies the driving signal RD2 to the row selection line RD2, thereby selecting the row selection line RD2. The driver circuit section further performs a control process that is similar to that performed for the first row. As in the case of the 1 F period, the driver circuit section repeats the control process until it selects the row selection line RDm of the m-th row, which is the last row, and terminates the 2 F period after performance of the control process is finished for the m-th row.

As described above, in the example of drive control shown in FIG. 3, outputs in the case of a reset operation are line-sequentially read to sensor signal lines in an odd F period, and, in an even F period, image-pickup results obtained in the odd F period that is provided prior to the even F period are line-sequentially read to the sensor signal lines.

When output signals are read using the source follower circuits that the amplifying TFTs 8 form, output voltages need to reach the ultimate achievable potential in the reading period. Accordingly, if each F period is short, there is a risk that a sufficient reading period is not ensured. Thus, it can be considered that, when there is a risk that it is impossible to perform reading of n rows in the 1 F period, i.e., when a reading time of 1 F/n is short for reading of one line, image-pickup results of odd rows/even rows are read in respective F periods at drive timing such as that in the example of drive control shown in FIG. 4. In other words, a vertical frequency is not changed, and a horizontal frequency is decreased, thereby ensuring a necessary reading time.

Figure 4:
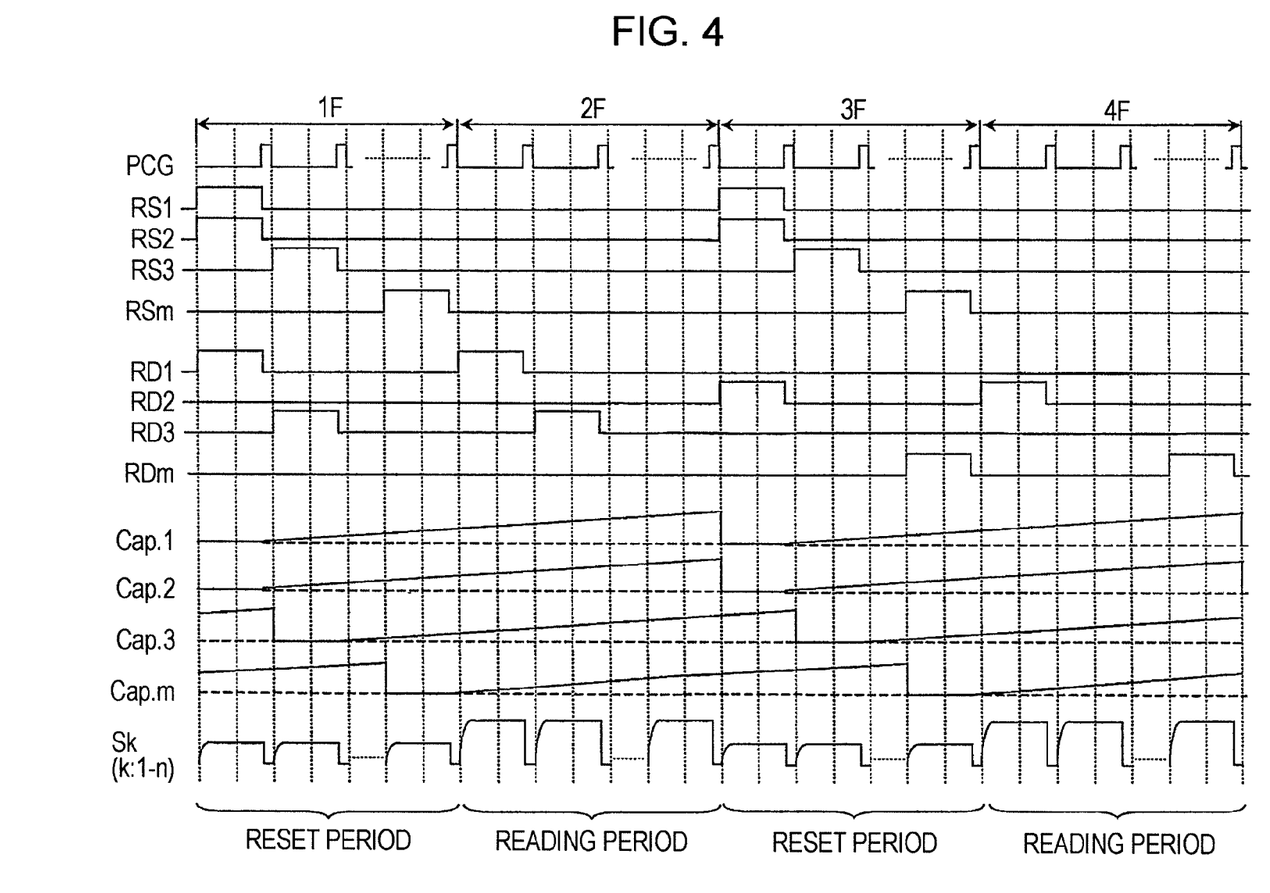
FIG. 4 is a timing chart (part 2) showing an example of drive control in the first embodiment of the present invention.

In other words, in the example of drive control shown in FIG. 4, reading of the image-pickup results of the even rows is performed in an F period, and reading of the image-pickup results of the storage capacitors of the odd rows is performed in the next F period. In addition, here, suppose that the number m of rows is an even number, and a description is made as follows.

Specifically, as shown in FIG. 4, in a 1 F period, the driver circuit section applies the driving signals RS1, RS2, and RD1 to the row reset lines RS1 and RS2, and the row selection line RD1, respectively, thereby selecting the row reset lines RS1 and RS2, and the row selection line RD1 and setting the reset TFTs 7 and the reading TFTs 9 that are connected to the row reset lines RS1 and RS2, and the row selection line RD1 to be in on-states. When the reset TFTs 7 are in the on-state, in the capacitors 6, stored electric charge is discharged, and the potentials between both electrodes are commonly set to GND. Additionally, when the reading TFTs 9 are in the on-state, outputs (stored electric charge) at a point in time at which the capacitors 6 are reset are line-sequentially read to the sensor signal lines S1 to Sn. However, in this case, the row selection line RD2 is not selected. Thus, outputs of the rows connected to the row selection line RD1 are read. After that, the driving circuit section pre-charges the sensor signal lines S1 to Sn at the reference potential at a time at which the driving circuit section applies the driving signal PCG to the pre-charge line PCG. Then, after the pre-charging, the driver circuit section selects row reset lines RS3 and RS4, and a row selection line RD3. After the driver circuit section repeats the above-described processing operation until row reset lines RSm-1 and RSm, and a row selection line RDm-1 are selected, the driver circuit section terminates the 1 F period.

In the next 2 F period, first, the driver circuit section applies the driving signal RD1 to the row selection line RD1, thereby selecting the row selection line RD1 and setting the reading TFTs 9 connected to the row selection line RD1 to be in an on-state. In this case, image-pickup results obtained in the 1 F period are maintained as voltages in the capacitors 6. Thus, when the reading TFTs 9 are in the on-state, the reading TFTs 9 read the voltages that are maintained in the capacitors 6 to the sensor signal lines S1 to Sn via the amplifying TFTs 8, which form the source follower circuits. After the row selection line RD1 is selected, the TFTs connected to the pre-charge line PCG are set to be in an on-state, whereby the sensor signal lines S1 to Sn are pre-charged at the reference potential. After the above-described processing operation, the driver circuit section applies the driving signal RD3 to the row selection line RD3, thereby selecting the row selection line RD3. After the driver circuit section further repeats a similar control process for the odd rows until it selects the row selection line RDm-1, the driver circuit section terminates the 2 F period.

In the next 3 F period, the driver circuit section selects the row reset lines RS1 and RS2, and the row selection line RD2, and sets the reset TFTs 7 and the reading TFTs 9 that are connected to the row reset lines RS1 and RS2, and the row selection line RD2 to be in on-states. Thus, the capacitors 6 connected to the drains of the reset TFTs 7 connected to the row reset lines RS1 and RS2 are reset. Furthermore, outputs (stored electric charge) at a point in time at which the capacitors 6 are reset are line-sequentially read to the sensor signal lines S1 to Sn by the reading TFTs 9 connected to the row selection line RD2. After that, the driving circuit section pre-charges the sensor signal lines S1 to Sn at the reference potential at a time at which the driving circuit section applies the driving signal PCG to the pre-charge line PCG. As described above, in the 3 F period, outputs of the even rows in the case of reset are obtained via the sensor signal lines S1 to Sn, which is different from the case of the 1 F period. Then, also in the case of the 3 F period, as in the case of the 1 F period, after the driver circuit section repeats the above-described processing operation until the row reset lines RSm-1 and RSm, and the row selection line RDm are selected, the driver circuit section terminates the 3 F period.

In the next 4 F period, first, the driver circuit section applies the driving signal RD2 to the row selection line RD2, thereby selecting the row selection line RD2 and setting the reading TFTs 9 connected to the row selection line RD2 to be in an on-state. In this case, image-pickup results obtained in the 3 F period are maintained as voltages in the capacitors 6. Thus, when the reading TFTs 9 are in the on-state, the reading TFTs 9 read the voltages that are maintained in the capacitors 6 to the sensor signal lines S1 to Sn via the amplifying TFTs 8, which form the source follower circuits. After the row selection line RD2 is selected, the TFTs connected to the pre-charge line PCG are set to be in an on-state, whereby the sensor signal lines S1 to Sn are pre-charged at the reference potential. After the above-described processing operation, the driver circuit section applies a driving signal RD4 to a row selection line RD4, thereby selecting the row selection line RD4. After the driver circuit section further repeats a similar control process for the even rows until it selects the row selection line RDm, the driver circuit section terminates the 4 F period.

As described above, in the example of drive control shown in FIG. 4, since the image-pickup results of the odd rows/even rows are alternately read in the respective F periods, a reading time for one horizontal line becomes 1 F/(n/2). Thus, the vertical frequency is not changed, and the horizontal frequency is decreased, so that the necessary reading time can be sufficiently ensured. Specifically, for example, a time can be ensured, which is twice the reading time for one horizontal line in the example of drive control described with reference to FIG. 3.

Figure 5:
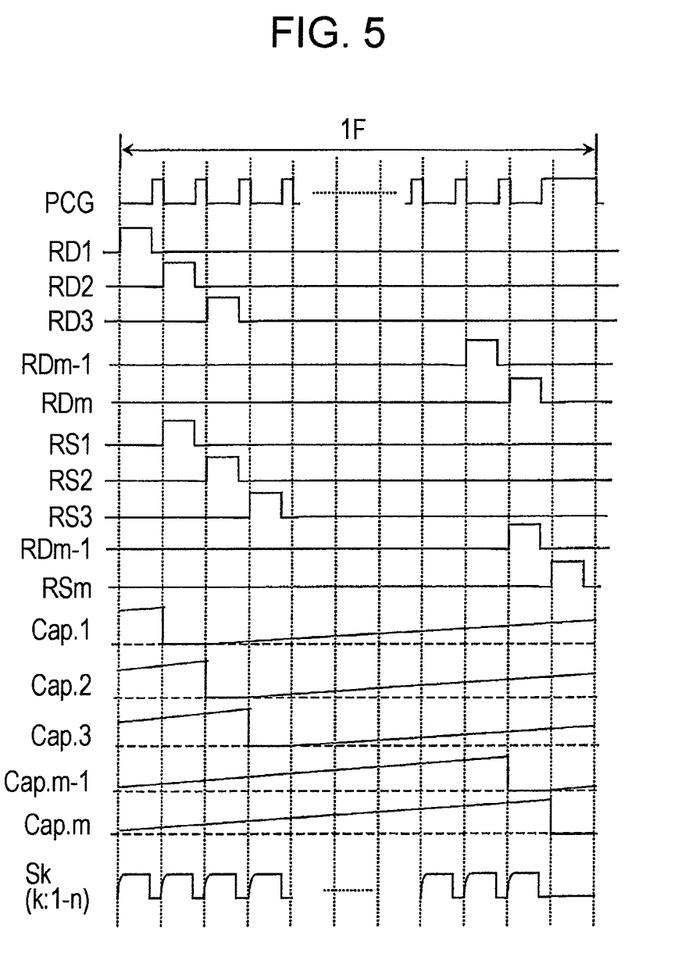
FIG. 5 is a timing chart (part 3) showing an example of drive control in the first embodiment of the present invention.

Furthermore, it can be considered that operation control is performed for the image-pickup element portions 4 at drive timing such as that in the example of drive control shown in FIG. 5. In the example of drive control that is illustrated as an example, both reading of image-pickup results of rows, and resetting of rows that are each disposed one row prior to the corresponding row are performed in one F period.

Specifically, as shown in FIG. 5, the driver circuit section applies the driving signal RD1 to the row selection line RD1, thereby setting the reading TFTs 9 connected to the row selection line RD1 to be in an on-state. The driver circuit section line-sequentially reads image-pickup results obtained in the previous F period to the sensor signal lines S1 to Sn. After that, the driver circuit section pre-charges the sensor signal lines S1 to Sn at the reference potential at a time at which the driving circuit section applies the driving signal PCG to the pre-charge line PCG. Then, after the pre-charging, the driver circuit section selects the row selection line RD2 and the row reset line RS1, and sets the reset TFTs 7 and the reading TFTs 9 that are connected to the row selection line RD2 and the row reset line RS1 to be in on-states. When the reset TFTs 7 connected to the reset line RS1 are in the on-state, in the capacitors 6, stored electric charge is discharged, and the potentials between both electrodes are commonly set to GND. In contrast, because the reading TFTs 9 connected to the row selection line RD2 are set to be in an on-state at the same time at which this operation is performed, image-pickup results of the row that is connected to the row selection line RD2 are read to the sensor signal lines S1 to Sn. After that, the driving circuit section pre-charges the sensor signal lines S1 to Sn at the reference potential. After the pre-charging, the driver circuit section selects the row selection line RD3 and the row reset line RS2. The driver circuit section repeats the above-described processing operation until the row selection line RDm and the row reset line RSm-1 are selected. Then, finally, the driver circuit section selects only the row reset line RSm, and resets the capacitors 6 that are disposed in the row connected to the row reset line RSm. After the driver circuit section pre-charges the sensor signal lines S1 to Sn, the driver circuit section terminates a 1 F period.

As described above, in the example of drive control shown in FIG. 5, because a row selection line RDk and a row reset line RSk-1 are driven at the same time for any row k (where k=2 to m-1), the same wire can be used. In other words, since reading of rows and resetting of rows that are each disposed one row prior to the corresponding row are performed in the same F period, signals for the reading and the resetting can be provided as common signals using the same wires. Thus, if the same wires using common signals are used, because the number of wires that exist in the image-display-region section 1 can be reduced, the aperture ratio of the image-display-region section 1 can be improved.

Specifically, in the example of drive control shown in FIG. 5, although commonality of driving signals can be realized, it is impossible to obtain outputs in the case of a reset operation. The outputs in the case of a reset operation are very useful in that offsets of output voltages caused by the source follower circuits are cancelled, and in that output errors due to variations in characteristics of the TFTs are greatly reduced, as described using the example of drive control shown in FIG. 3. In other words, in order to cancel the offsets of output voltages caused by the source follower circuits, it is necessary that the offsets be removed using the differences between image-pickup results and image-pickup results obtained in a dark room, i.e., in a space in which the amount of light is zero. Thus, it can be considered that operation control is performed for the image-pickup element portions 4 at drive timing such as that in the example of drive control shown in FIG. 6, whereby the outputs in the case of a reset operation can be obtained.

Figure 6:
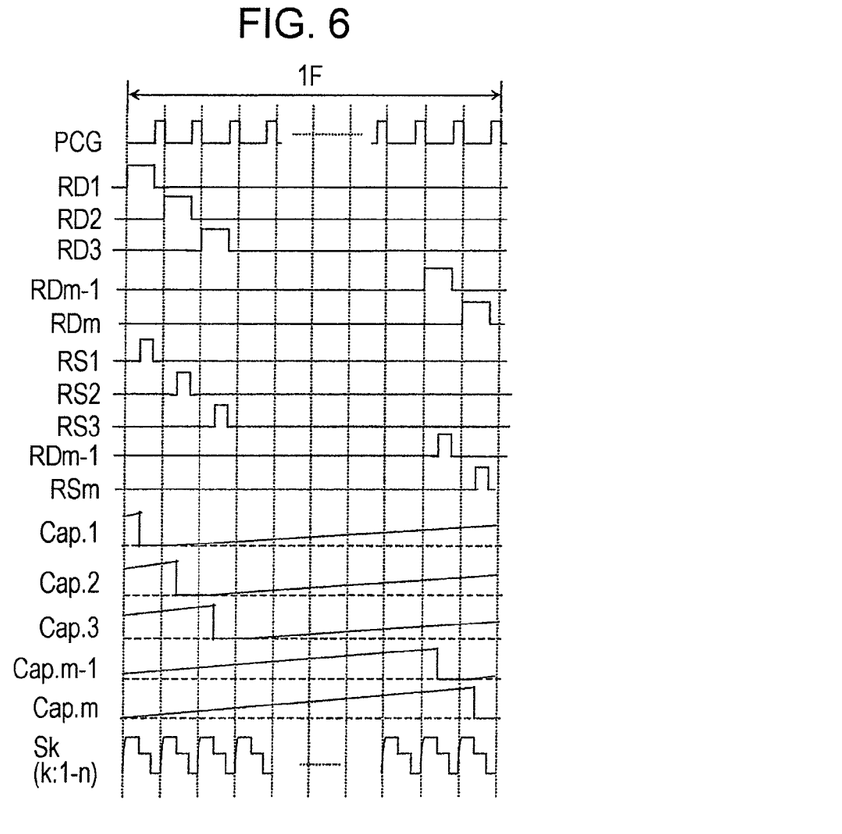
FIG. 6 is a timing chart (part 4) showing an example of drive control in the first embodiment of the present invention.

Specifically, as shown in FIG. 6, the driver circuit section applies the driving signal RD1 to the row selection line RD1, thereby setting the reading TFTs 9 connected to the row selection line RD1 to be in an on-state. The driver circuit section line-sequentially reads image-pickup results obtained in the previous F period to the sensor signal lines S1 to Sn. After that, the driver circuit section selects the row reset line RS1 in a period in which the row selection line RD1 is selected. By selecting the row reset line RS1, outputs in the case of a reset operation are line-sequentially read to the sensor signal lines S1 to Sn. In other words, by performing the above-described drive control, the image-pickup results obtained in the previous F period and the outputs in the case of a reset operation can be obtained in a reading period for one horizontal line. In this case, when the differences between the image-pickup results and the outputs in the case of a reset operation are obtained, the output offsets caused by the source follower circuits can be removed, for example, by utilizing a CDS (correlated double sampling) circuit that is generally used to drive a CCD. After that, the driver circuit section pre-charges the sensor signal lines S1 to Sn at the reference potential at a time at which the driving circuit section applies the driving signal PCG to the pre-charge line PCG. Then, after the pre-charging, the driver circuit section selects the row selection line RD2 and sets the reading TFTs 9 connected to the row selection line RD2 to be in an on-state. The driver circuit section further repeats a similar control process until the row selection line RDm is selected.

As described above, in the example of drive control shown in FIG. 6, both reading of the image-pickup results and resetting are performed in the same clock cycle in one F period, and the differences between the image-pickup results and the outputs in the case of a reset operation can be obtained. Accordingly, even when the number of wires that exist in the image-display-region section 1 is reduced in order to improve the aperture ratio of the image-display-region section 1, the offsets of output voltages caused by the source follower circuits can be cancelled, and the output errors due to variations in characteristics of the TFTs can be greatly reduced.

According to the image-pickup element portions 4 in the above-described first embodiment, even in the case of any one of the examples of driven control shown in FIGS. 3 to 6, the amplifying TFTs 8 form the source follower circuits. Accordingly, when electric charge (image-pickup results) stored in the capacitors 6 are read, analog output can be performed by utilizing the source follower circuits. Thus, for example, even when the respective elements 5 to 9 constituting the image-pickup element portions 4 are formed on the p-Si substrate in order to be easily integrated with the display function, analog output can be realized as in the case of CCDs or CMOS image sensors, which are general image-pickup elements, whereby the speed of image-pickup processing can be increased and the number of gradations of the image-pickup results can be increased.

Additionally, according to the image-pickup element portions 4 in the first embodiment, since the sensor TFTs 5 are used as photoelectric conversion elements, the sensor TFTs 5 can be manufactured using a typical TFT manufacturing method, i.e., using a portion of a general manufacturing process of liquid-crystal display elements. Furthermore, an exactly similar thing can be also applied to the reset TFTs 7, which function as reset means. Thus, according to the image-pickup element portions 4 in the first embodiment, the respective constituent elements can be manufactured using a process the same as that of typical TFTs. For example, the image-pickup element portions 4 have the respective constituent elements that can be easily disposed in the pixel units 2 of the liquid-crystal display apparatus. In other words, the image-pickup element portions 4 are very suitable for realization of integration with the display function.

In addition, according to the image-pickup element portions 4 in the embodiment, the respective constituent elements 5 to 9 are integrated and disposed in correspondence with the respective pixel units 2, which are disposed in the matrix. Thus, for example, not only a touch panel function or a scanner function can be realized, but also multipoint recognition that was difficult to be realized in touch panels in the prior art can be realized. There is a probability that the image-pickup element portions 4 will serve as key devices of a new user interface that does not exist in the prior art. Furthermore, it can be considered that the image-pickup element portions 4 are utilized as dimmer sensors for the backlight in the display element portions 3 by using the characteristics of the analog output.

Second Embodiment

Next, a second embodiment of the present invention will be described. However, herein, only the difference between the second embodiment and the above-described first embodiment is described.

In the first embodiment, the reset TFT 7 is provided as reset means. Accordingly, when the image-pickup element portion 4 is disposed in each of the respective pixel units 2, which are disposed in the matrix, a decrease in the aperture ratio of the display element portion 3 only by a portion corresponding to the provided reset TFT 7 may occur. In contrast, although the gate voltage of the sensor TFT 5 is set to be equal to or lower than a threshold when the sensor TFT 5 is used as a photoelectric conversion element, it is known that, if the setting of the gate voltage is appropriately changed, the sensor TFT 5 can operate as a normal transistor. Thus, in an image-pickup element portion 4 that is to be described as an example in the embodiment, the gate voltage of the sensor TFT 5 is changed, thereby properly using a photoelectric conversion function and a reset function of the sensor TFT 5. Accordingly, integration of the reset function for the capacitor 6 is realized without the reset TFT 7.

Figure 7:
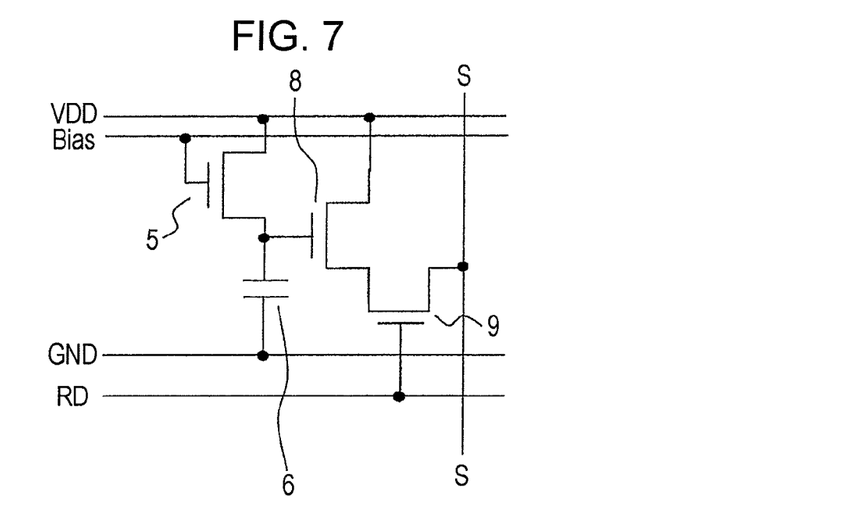
FIG. 7 is a circuit diagram showing an example of a configuration of the main portion in a second embodiment of the image-pickup device according to the present invention.

FIG. 7 is a circuit diagram showing an example of a configuration of the main portion of an image-pickup device according to the second embodiment of the present invention. Although the image-pickup element portion 4, which is illustrated as an example, includes the sensor TFT 5, the capacitor 6, the amplifying TFT 8, and the reading TFT 9, which are formed on a p-Si substrate, as in the case of the first embodiment, the reset TFT 7 is not formed, which is different from the case of the first embodiment.

The bias wire Bias is connected to the gate electrode of the sensor TFT 5, and the power-source line VDD is connected to the drain electrode of the sensor TFT 5. In addition, when a voltage value that is applied via the bias wire Bias is lower than a predetermined threshold, the sensor TFT 5 functions as a photoelectric conversion element. In other words, when the predetermined threshold is set so as to cause the sensitivity and S/N of the sensor to be optimized and a voltage lower than the threshold voltage is applied to the bias wire Bias, the sensor TFT 5 functions as a photoelectric conversion element. In contrast, when the applied voltage value is equal to or higher than the threshold, the sensor TFT 5 functions as a switching TFT, and discharges electric charge in the capacitor 6 so that the capacitor 6 is reset to enter an initialization state. In other words, when the voltage that is equal to or higher than the threshold is applied to the bias wire Bias and a voltage of the power-source line VDD is set to have the ground (GND) potential, the sensor TFT 5 functions as a reset TFT. As described above, as in the case of the above-mentioned configuration in the embodiment, even in a case in which the image-pickup element portion 4 does not include the reset TFT 7, when the voltages that are applied to the bias wire Bias and the power-source line VDD are changed in accordance with a lapse of time, the sensor TFT 5 functions as a photoelectric conversion element or a reset TFT.

In other words, in the image-pickup element portion 4 according to the second embodiment, the reset function that the sensor TFT 5 has, and a function of switching the gate voltage that is to be applied to the sensor TFT 5 realize a function of the reset means for discharging stored electric charge in the capacitor 6. In other words, for the sensor TFT 5 that functions as a photoelectric conversion element when the gate voltage is lower than the threshold, the image-pickup element portion 4 is configured so as to discharge electric charge in the capacitor 6 by switching the gate voltage of the sensor TFT 5 so that the gate voltage is set to be equal to or higher than the threshold.

Figure 8:
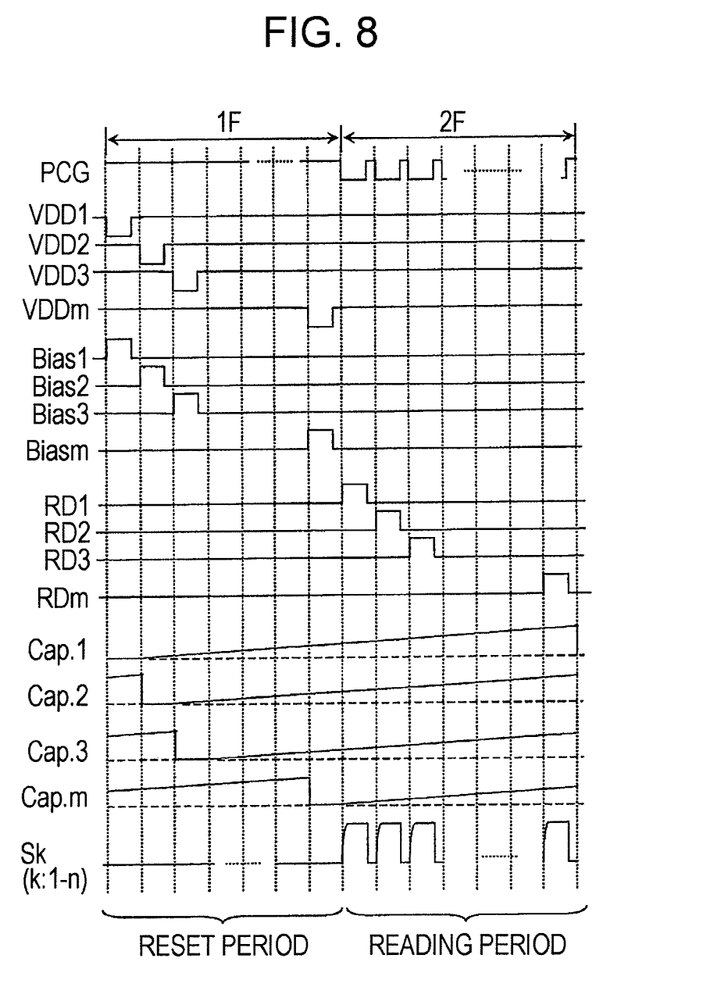
FIG. 8 is a timing chart (part 1) showing an example of drive control in the second embodiment of the present invention.
Figure 9:
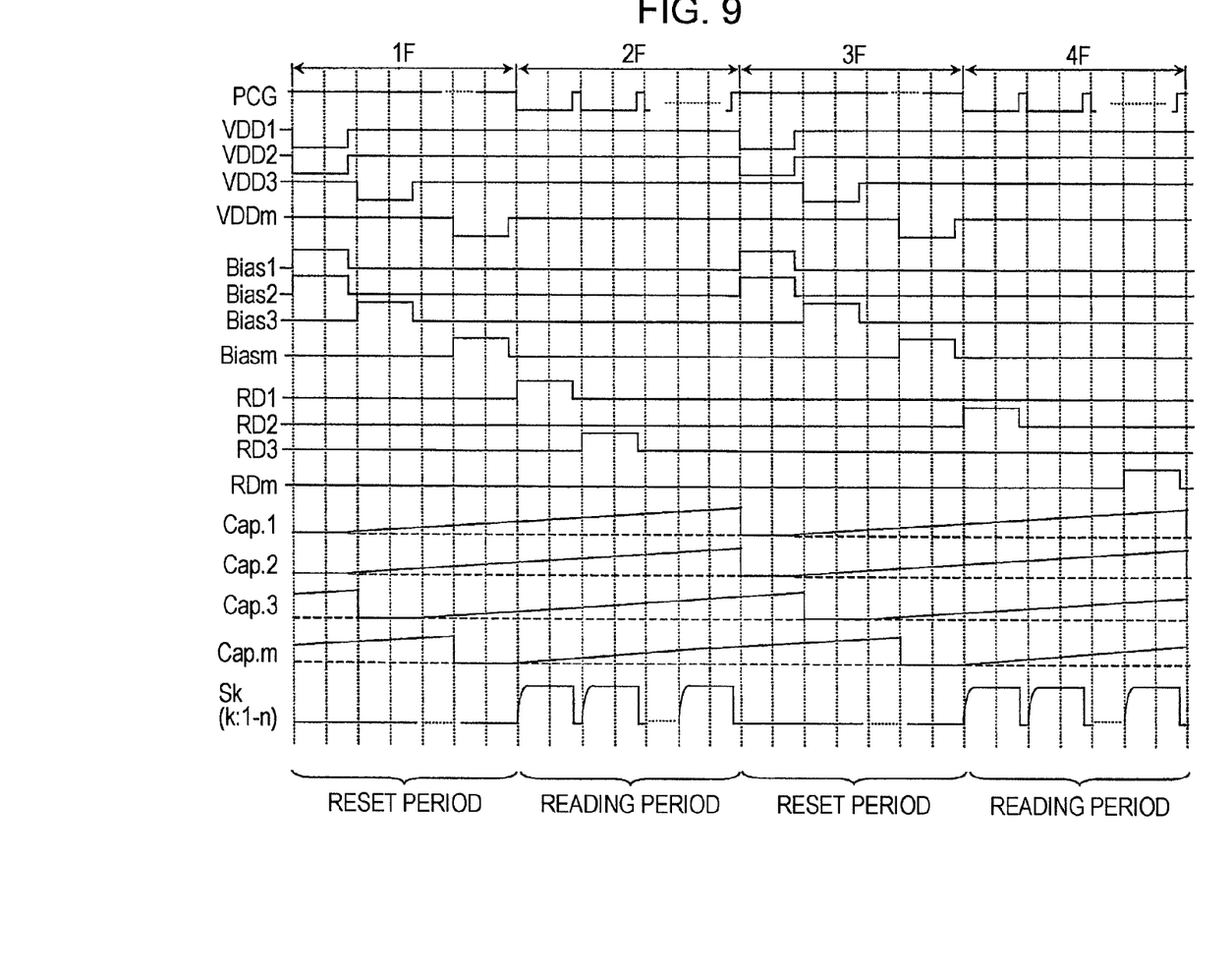
FIG. 9 is a timing chart (part 2) showing an example of drive control in the second embodiment of the present invention.
Figure 10:
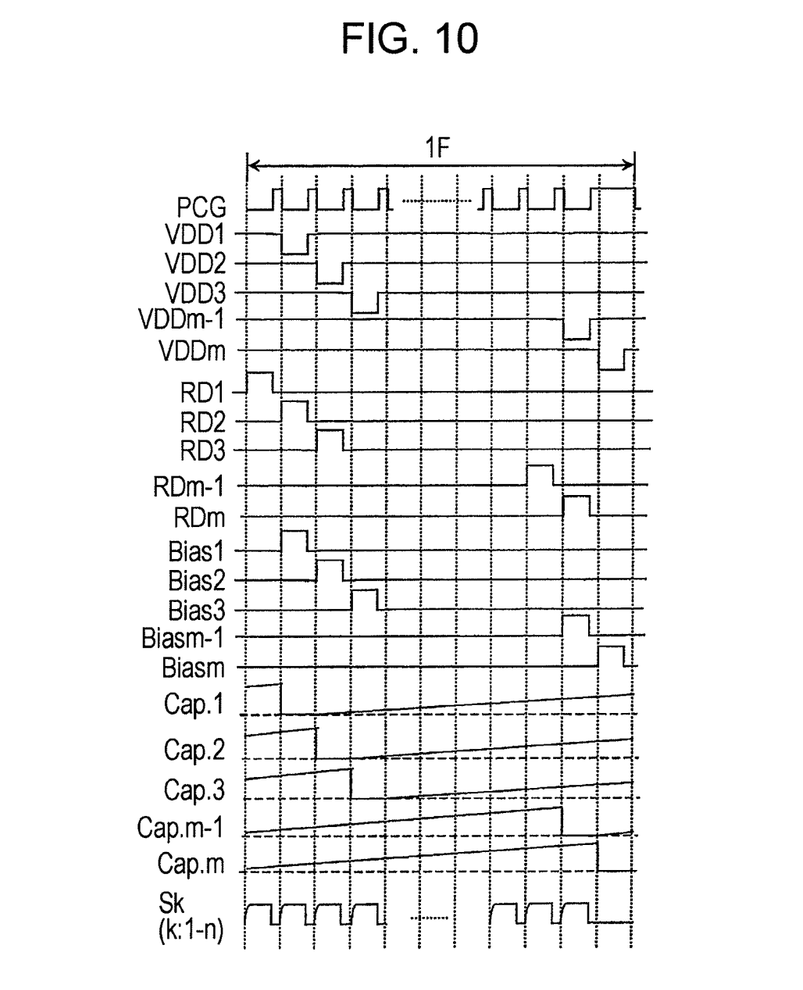
FIG. 10 is a timing chart (part 3) showing an example of drive control in the second embodiment of the present invention.

Next, processing operations in a case in which the image-pickup element portions 4 configured as described above are driven are described. FIGS. 8 to 10 are timing charts showing examples of drive control performed for the image-pickup element portions 4.

For example, in the example of drive control shown in FIG. 8, an F period is defined as a reset period, and the next F period is defined as a reading period. These periods are repeated. In addition, in the reset period, discharging of electric charge in the capacitors 6 is performed, and reading of stored electric charge in (voltages across) the capacitors 6 immediately after the discharging of electric charge has been performed is performed. Additionally, in the reading period, reading of stored electric charge in the capacitors 6 in a state in which discharging of electric charge is not performed is performed. In this manner, the amounts of electric charge that are converted by the sensor TFTs 5 can be determined from the differences between respective read results.

More specifically, as shown in FIG. 8, in a 1 F period, the driver circuit section applies a driving signal Bias1 to a bias line Bias1 of the first row disposed in the matrix, thereby setting the sensor TFTs 5 connected to the bias line Bias1 to be in an on-state. Then, the driver circuit section applies a driving signal VDD1 to a power-source line VDD1 when the sensor TFTs 5 are in the on-state. Accordingly, electric charge that exists in the capacitors 6 is discharged via the sensor TFTs 5 connected to the bias line Bias1, and the potentials between both electrodes of the capacitors 6 are commonly set to GND. After that, the driver circuit section sets a voltage applied to the bias line Bias1 to have a low level, thereby setting the sensor TFTs 5 connected to the bias line Bias1 to be in an off-state. Here, the voltage applied to the bias line Bias1 has a voltage value that is lower than the threshold of the sensor TFTs 5. Then, the driver circuit section sets a voltage applied to the power-source line VDD1 to have a high level when the sensor TFTs 5 are in the off-state. Accordingly, the sensor TFTs 5 connected to the bias line Bias1 function as photoelectric conversion elements, and the capacitors 6 is charged with electric charge in accordance with light with which the sensor TFTs 5 are irradiated. After that, the driver circuit section selects a bias line Bias2 and a power-source line VDD2, and further performs a control process that is similar to that performed for the first row. Then, the driver circuit section repeats the above-described series of processes until it selects a bias line Biasm and a power-source line VDDm of the m-th row, which is the last row disposed in the matrix, and terminates the 1 F period after performance of the series of processes is finished for the m-th row. In the 1 F period, the sensor signal lines S1 to Sn are always pre-charged at the reference potential using the driving signal PCG that is applied to the pre-charge line PCG.

In contrast, in a 2 F period that is a reading period, first, the driver circuit section applies the driving signal RD1 to the row selection line RD1, thereby selecting the row selection line RD1 and setting the reading TFTs 9 connected to the row selection line RD1 to be in an on-state. In this case, image-pickup results obtained in the 1 F period are maintained as voltages in the capacitors 6. Thus, when the reading TFTs 9 are in the on-state, the reading TFTs 9 read the voltages that are maintained in the capacitors 6 to the sensor signal line S1 via the amplifying TFTs 8, which form the source follower circuits. After the row selection line RD1 is selected, the TFTs connected to the pre-charge line PCG are set to be in an on-state, whereby the sensor signal line S1 is pre-charged at the reference potential. After the above-described processing operation, the driver circuit section applies the driving signal RD2 to the row selection line RD2, thereby selecting the row selection line RD2. The driver circuit section further performs a control process that is similar to that performed for the first row. As in the case of the 1 F period, the driver circuit section repeats the control process until it selects the row selection line RDm of the m-th row, which is the last row, and terminates the 2 F period after performance of the control process is finished for the m-th row.

As described above, in the example of drive control shown in FIG. 8, all of the sensor signal lines are maintained at the reference potential in an odd F period, and image-pickup results obtained in the 1 F period are line-sequentially read to the sensor signal lines in an even F period.

Additionally, for example, in the example of drive control shown in FIG. 9, also when output signals are read using the source follower circuits, in order to ensure a necessary reading time in such a manner that a vertical frequency is not changed, and that a horizontal frequency is decreased, reading of image-pickup results of the even rows is performed in an F period, and reading of image-pickup results of the storage capacitors of the odd rows is performed in the next F period.

More specifically, as shown in FIG. 9, in a 1 F period, the driver circuit section applies the driving signals Bias1, Bias2, VDD1, and VDD2 to the bias lines Bias1 and Bias2, and the power-source lines VDD1 and VDD2, respectively, thereby setting the sensor TFTs 5 connected to the bias lines Bias1 and Bias2, and the power-source lines VDD1 and VDD2 to be in an on-state. The power-source lines VDD1 and VDD2 have a low level when the sensor TFTs 5 are in the on-state. Accordingly, electric charge that exists in the capacitors 6 is discharged via the sensor TFTs 5, and the potentials between both electrodes of the capacitors 6 are commonly set to GND. Furthermore, the reading TFTs 9 are set to be in an on-state, whereby outputs (stored electric charge) at a point in time at which the capacitors 6 are reset are line-sequentially read to the sensor signal lines S1 to Sn. However, in this case, the row selection line RD2 is not selected. Thus, outputs of the rows connected to the row selection line RD1 are read. After that, the driving circuit section pre-charges the sensor signal lines S1 to Sn at the reference potential at a time at which the driving circuit section applies the driving signal PCG to the pre-charge line PCG. Then, after the pre-charging, the driver circuit section selects power-supply line VDD3 and VDD4, and the row selection line RD3. After the driver circuit section repeats the above-described processing operation until power-source line VDDm-1 and VDDm, and the row selection line RDm-1 are selected, the driver circuit section terminates the 1 F period.

In the next 2 F period, first, the driver circuit section applies the driving signal RD1 to the row selection line RD1, thereby selecting the row selection line RD1 and setting the reading TFTs 9 connected to the row selection line RD1 to be in an on-state. In this case, image-pickup results obtained in the 1 F period are maintained as voltages in the capacitors 6. Thus, when the reading TFTs 9 are in the on-state, the reading TFTs 9 read the voltages that are maintained in the capacitors 6 to the sensor signal lines S1 to Sn via the amplifying TFTs 8, which form the source follower circuits. After the row selection line RD1 is selected, the TFTs connected to the pre-charge line PCG are set to be in an on-state, whereby the sensor signal lines S1 to Sn are pre-charged at the reference potential. After the above-described processing operation, the driver circuit section applies the driving signal RD3 to the row selection line RD3, thereby selecting the row selection line RD3. After the driver circuit section further repeats a similar control process for the odd rows until it selects the row selection line RDm-1, the driver circuit section terminates the 2 F period.

In the next 3 F period, the driver circuit section applies the driving signals Bias1, Bias2, VDD1, and VDD2 to the bias lines Bias1 and Bias2, and the power-source lines VDD1 and VDD2, respectively, thereby setting the sensor TFTs 5 connected to the bias lines Bias1 and Bias2, and the power-source lines VDD1 and VDD2 to be in an on-state. Thus, the capacitors 6 are reset. Furthermore, outputs (stored electric charge) at a point in time at which the capacitors 6 are reset are line-sequentially read to the sensor signal lines S1 to Sn by the reading TFTs 9 connected to the row selection line RD2. After that, the driving circuit section pre-charges the sensor signal lines S1 to Sn at the reference potential at a time at which the driving circuit section applies the driving signal PCG to the pre-charge line PCG. As described above, in the 3 F period, outputs of the even rows in the case of reset are obtained via the sensor signal lines S1 to Sn, which is different from the case of the 1 F period. Then, also in the case of the 3 F period, as in the case of the 1 F period, after the driver circuit section repeats the above-described processing operation until the power-source line VDDm-1 and VDDm, and the row selection line RDm are selected, the driver circuit section terminates the 3 F period.

In the next 4 F period, first, the driver circuit section applies the driving signal RD2 to the row selection line RD2, thereby selecting the row selection line RD2 and setting the reading TFTs 9 connected to the row selection line RD2 to be in an on-state. In this case, image-pickup results obtained in the 3 F period are maintained as voltages in the capacitors 6. Thus, when the reading TFTs 9 are in the on-state, the reading TFTs 9 read the voltages that are maintained in the capacitors 6 to the sensor signal lines S1 to Sn via the amplifying TFTs 8, which form the source follower circuits. After the row selection line RD2 is selected, the TFTs connected to the pre-charge line PCG are set to be in an on-state, whereby the sensor signal lines S1 to Sn are pre-charged at the reference potential. After the above-described processing operation, the driver circuit section applies the driving signal RD4 to the row selection line RD4, thereby selecting the row selection line RD4. After the driver circuit section further repeats a similar control process for the even rows until it selects the row selection line RDm, and terminates the 4 F period.

As described above, in the example of drive control shown in FIG. 9, since the image-pickup results of the odd rows/even rows are alternately read in the respective F periods, a reading time for one horizontal line becomes 1 F/(n/2). Thus, the vertical frequency is not changed, and the horizontal frequency is decreased, so that the necessary reading time can be sufficiently ensured. Specifically, for example, a time can be ensured, which is twice the reading time for one horizontal line in the example of drive control described with reference to FIG. 3.

Furthermore, for example, in the example of drive control shown in FIG. 10, both reading of image-pickup results of rows, and resetting of rows that are each disposed one row prior to the corresponding row are performed in one F period.

Specifically, as shown in FIG. 10, the driver circuit section applies the driving signal RD1 to the row selection line RD1, thereby setting the reading TFTs 9 connected to the row selection line RD1 to be in an on-state. The driver circuit section line-sequentially reads image-pickup results obtained in the previous F period to the sensor signal lines S1 to Sn. After that, the driver circuit section pre-charges the sensor signal lines S1 to Sn at the reference potential at a time at which the driving circuit section applies the driving signal PCG to the pre-charge line PCG. Then, after the pre-charging, the driver circuit section applies the driving signals RD2, Bias1, and VDD1. Accordingly, because the power-source lines VDD1 and VDD2 have a low level when the sensor TFTs 5 connected to the power-source line VDD1 are in an on-state, electric charge that exists in the capacitors 6 is discharged via the sensor TFTs 5, and the potentials between both electrodes of the capacitors 6 are commonly set to GND. In contrast, because the reading TFTs 9 connected to the row selection line RD2 are set in an on-state at the same time at which this operation is performed, image-pickup results of the row that is connected to the row selection line RD2 are read to the sensor signal lines S1 to Sn. Then, the driving circuit section pre-charges the sensor signal lines S1 to Sn at the reference potential. After the pre-charging, the driver circuit section applies the driving signals RD3, Bias2, and VDD2. The driver circuit section repeats the above-described processing operation until the row selection line RDm, and the power-source line VDDm-1 are selected. Then, finally, the driver circuit section selects only the power-supply line VDDm, and resets the capacitors 6 that are disposed in the row connected to the power-source line VDDm. After the driver circuit section pre-charges the sensor signal lines S1 to Sn, the driver circuit section terminates a 1 F period.

As described above, in the example of drive control shown in FIG. 10, because a row selection line RDk and a power-supply line VDDk-1 are driven at the same time for any row k (where k=2 to m-1), the same wire can be used. In other words, since reading of rows and resetting of rows that are each disposed one row prior to the corresponding row are performed in the same F period, signals for the reading and the resetting can be provided as common signals using the same wires. Thus, if the same wires using common signals are used, because the number of wires that exist in the image-display-region section 1 can be reduced, the aperture ratio of the image-display-region section 1 can be improved.

In addition, although the description is omitted here, also in the second embodiment, for example, as in the example of drive control shown in FIG. 6 in the first embodiment, both reading of the image-pickup results and resetting may be performed in the same clock cycle in one F period, and the differences between the image-pickup results and the outputs in the case of a reset operation may be obtained.

According to the image-pickup element portions 4 in above-described second embodiment, even in the case of any one of the examples of driven control shown in FIGS. 8 to 10, the amplifying TFTs 8 form the source follower circuits as in the case of the first embodiment. Accordingly, when electric charge (image-pickup results) stored in the capacitors 6 are read, analog output can be performed by utilizing the source follower circuits. Thus, for example, even when the respective elements 5 to 9 constituting the image-pickup element portions 4 are formed on the p-Si substrate in order to be easily integrated with the display function, analog output can be realized as in the case of CCDs or CMOS image sensors, which are general image-pickup elements, whereby the speed of image-pickup processing can be increased and the number of gradations of the image-pickup results can be increased.

Furthermore, according to the image-pickup element portion 4 in the second embodiment, the gate voltage of the sensor TFT 5 is changed, thereby properly using the photo-electric conversion function and the rest function of the sensor TFT 5. Accordingly, because integration of the reset function for the capacitor 6 is realized without the reset TFT 7, the circuit scale of the image-pickup element portion 4 can be reduced, and, even when integration with the display function is realized, the aperture ratio of the display element portion 3 is not decreased.

Additionally, the above-described first and second embodiments are described as preferable embodiments according to the present invention. The present invention is not limited to the contents of the embodiments. Modifications may be appropriately made without departing from the gist of the present invention.

The invention claimed is:
1. An image-pickup device comprising: a plurality of pixels, each comprising a photoelectric conversion element that converts light into electric charge, a storage capacitor that stores the electric charge which the photoelectric conversion element has obtained by conversion, reset means for discharging the electric charge in the storage capacitor, and an amplifying thin-film transistor that receives, amplifies, and outputs the electric charge stored in the storage capacitor, and characterized in that a source electrode of the amplifying thin-film transistor is connected to a power-source supplying line, a gate electrode of the amplifying thin-film transistor is connected to the storage capacitor, and the amplifying thin-film transistor forms a source follower circuit, and further wherein one signal line provides both a row reset signal and a row selection signal for each of a plurality of adjacent rows and further wherein the plurality of pixels are arranged such that a group of a plurality of conductive lines are formed between adjacent pixels and contact detecting elements such that at least one conductive line of each group of lines is connected to a pixel and a plurality of the conductive lines are connected to each contact detecting element.

2. The image-pickup device according to claim 1, characterized in that the photoelectric conversion element comprises a sensor thin-film transistor in which a leakage current changes in accordance with an amount of received light.

3. The image-pickup device according to claim 2, characterized in that the reset means comprises a reset thin-film transistor that is disposed between the storage capacitor and a ground wire.

4. The image-pickup device according to claim 2, characterized in that the reset means comprises a reset function which the sensor thin-film transistor has, and a function of switching a gate voltage that is to be applied to the sensor thin-film transistor, and in that the reset means is configured, for the sensor thin-film transistor that functions as the photoelectric conversion element when the gate voltage is lower than a threshold, in such a manner that the switching function switches the gate voltage so that the gate voltage is set to be equal to or higher than the threshold, whereby the electric charge in the storage capacitor is discharged by the reset function.

5. A display apparatus comprising: image display elements that are disposed in a matrix, and image-pickup devices that are attached to the image display elements, the image-pickup devices including a plurality of image generating pixels, each including a photoelectric conversion element that convert light into electric charge, storage capacitors that store the electric charge which the photoelectric conversion elements have obtained by conversion, reset means for discharging the electric charge in the storage capacitors, and amplifying thin-film transistors that receive, amplify, and output the electric charge stored in the storage capacitors, characterized in that source electrodes of the amplifying thin-film transistors are connected to a power-source supplying line, gate electrodes of the amplifying thin-film transistors are connected to the storage capacitors, and the amplifying thin-film transistors form source follower circuits, and characterized in that at least the photoelectric conversion elements, the storage capacitors, and the amplifying thin-film transistors are integrated, and disposed in correspondence with the image display elements, and further wherein one signal line provides both a row reset signal and a row selection signal for each of a plurality of adjacent rows and further wherein the image generating pixels are arranged such that a group of a plurality of conductive lines are formed between adjacent image generating pixels and contact detecting elements such that at least one conductive line of each group of lines is connected to an image generating pixel and a plurality of the conductive lines are connected to each contact detecting element.

6. The display apparatus according to claim 5, characterized by being configured so as to read, in a field period, stored electric charge in the storage capacitors after discharging of electric charge is performed by the reset means, so as to read, in the next field period, stored electric charge in the storage capacitors in a state in which discharging of electric charge is not performed by the reset means, and so as to determine amounts of electric charge that are converted by the photoelectric conversion elements from differences between respective read results.

7. The display apparatus according to claim 5, characterized by being configured, when the photoelectric conversion elements, the storage capacitors, and the amplifying thin-film transistors are also disposed in the matrix in correspondence with the image display elements, so as to perform, in a field period, reading of stored electric charge in the storage capacitors of even rows of the matrix, and so as to perform, in the next field period, reading of stored electric charge in the storage capacitors of odd rows of the matrix.

8. The display apparatus according to claim 5, characterized by being configured, when the photoelectric conversion elements, the storage capacitors, and the amplifying thin-film transistors are also disposed in the matrix in correspondence with the image display elements, so as to perform, in one field period, based on common signals, both reading of stored electric charge in the storage capacitors of rows of the matrix, and discharging of electric charge by the reset means for the storage capacitors of rows which are each disposed one row prior to the corresponding row in a reading sequence.

9. The display apparatus according to claim 5, characterized by being configured so as to perform, in the same clock cycle in one field period, both reading of stored electric charge in the storage capacitors, and discharging of electric charge by the reset means for the storage capacitors.

* * * * *